Figure 1:
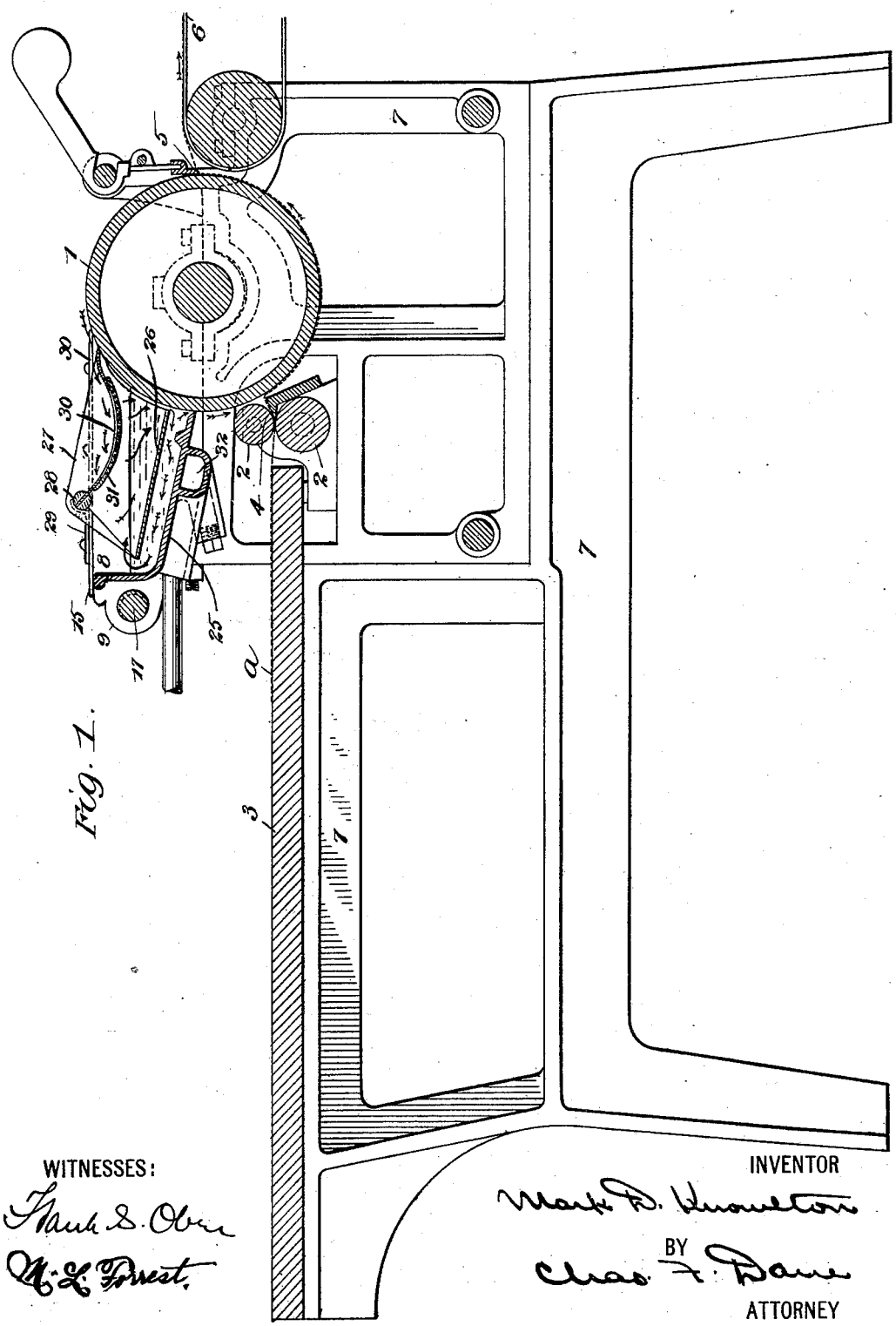

UNITED STATES PATENT OFFICE.

ROBERT M. JOHNSON, OF LANCASTER, PENNSYLVANIA.

WICK-TRIMMER.

SPECIFICATION forming part of Letters Patent No. 676,236, dated June 11, 1901.

Application filed September 1, 1900. Serial No. 28,765. (No model.)

*To all whom it may concern:*

Be it known that I, ROBERT M. JOHNSON, a citizen of the United States, and a resident of Lancaster, in the county of Lancaster and State of Pennsylvania, have invented certain new and useful Improvements in Wick-Trimmers, of which the following is a full, clear, and exact description.

The purpose of the invention is to provide a simple device which will serve to clamp a wick to be trimmed and by means of which the wick will not only be compressed at its exposed or igniting surface, but whereby also a straight horizontal line may be established at the charred portion of the wick and a substantial surface obtained at each side of the wick, upon which surfaces the shears or scissors employed for cutting the wick may bear or over which surfaces the wiping material for the wick may be drawn.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved device, showing said device applied to a wick. Fig. 2 is an edge view of the device, a wick and burner being shown in connection therewith in dotted lines; and Fig. 3 is a transverse section taken practically on the line 3 3 of Fig. 1.

Two blades or jaws 10 are employed, which blades or jaws when closed are in parallelism, and said blades or jaws at their rear portions cross one another and are pivotally connected by a suitable pin 11 in similar manner to the blades of a pair of shears. At the rear of the pivot 11 each blade or jaw 10 is provided with a shank 13, and each shank is usually connected with a loop 14, through which, respectively, the thumb and a finger of the hand may be passed for the purpose of manipulating the jaws or blades.

The opposing faces 12 of the jaws or blades 10 are flat, being at right angles to the plane of the jaws or blades, so that when the jaws or blades are brought together the opposing flat faces 10 will engage each other throughout the thickness of the blades or jaws and the said jaws or blades will present flat upper and lower surfaces. If desired, at a point in the flat clamping-surface of one or both of the jaws 12 a longitudinal groove 16 may be produced, as shown in Fig. 3, so that when a wick 17 is clamped or compressed between the jaws or blades 10 portions of the wick will enter the groove or grooves 16, and thus prevent the device from slipping; but preferably in the use of the device when a wick is to be clamped the jaws or blades 10 are made to rest upon the upper surface of the wick-tube, so that said jaws or blades will lie in a horizontal plane; but, if desired, as shown in Fig. 2, the cap of the burner need not be removed and the jaws or blades may rest upon the crown of the burner-cap, the wick having been turned up sufficiently, so that it may be grasped between the said blades or jaws.

The opposing faces of the portions of the jaws or blades 10 at which the pivot 11 is located are recessed to produce depressions 15, so that one section of the device at the pivot may fit close to the opposing section and the side faces of the device be rendered substantially in the same plane. Thus it will be observed that when a wick 17 is held between the blades or jaws 10 of the device the wick is compressed and rendered solid at its burning-surface or point of ignition, at which point the device is to engage with the wick, and in engaging the device with the wick the upper surface of the device is designedly brought just below the whole of the charred line of the wick, so that the charred portion of the wick above the jaws or blades may be wiped off and the surface of the wick to be ignited left perfectly straight and practically without any spurs, so that the flame will not only be broad, but will be compact, the upper surface of the device serving as a bearing or guide for the wiping material; but should scissors or shears be employed to remove the charred surface of the wick or trim the same the upper surface of the device serves as a guide and bearing for the scissors or shears, insuring a straight and horizontal cut.

Having thus described my invention, I claim as new and desire to secure by Letters Patent—

1. A device for trimming wicks, comprising

No. 676,237. Patented June 11, 1901.
M. D. KNOWLTON.
GLUE APPLYING MACHINE.
(Application filed Oct. 13, 1899.)
(No Model.) 3 Sheets—Sheet 1.

WITNESSES: INVENTOR
Frank S. Ober Mark D. Knowlton
N. L. Forrest BY Chas. F. Dane
ATTORNEY No. 676,237. Patented June 11, 1901.
M. D. KNOWLTON.
GLUE APPLYING MACHINE.
(Application filed Oct. 13, 1899.)
(No Model.) 3 Sheets—Sheet 2.
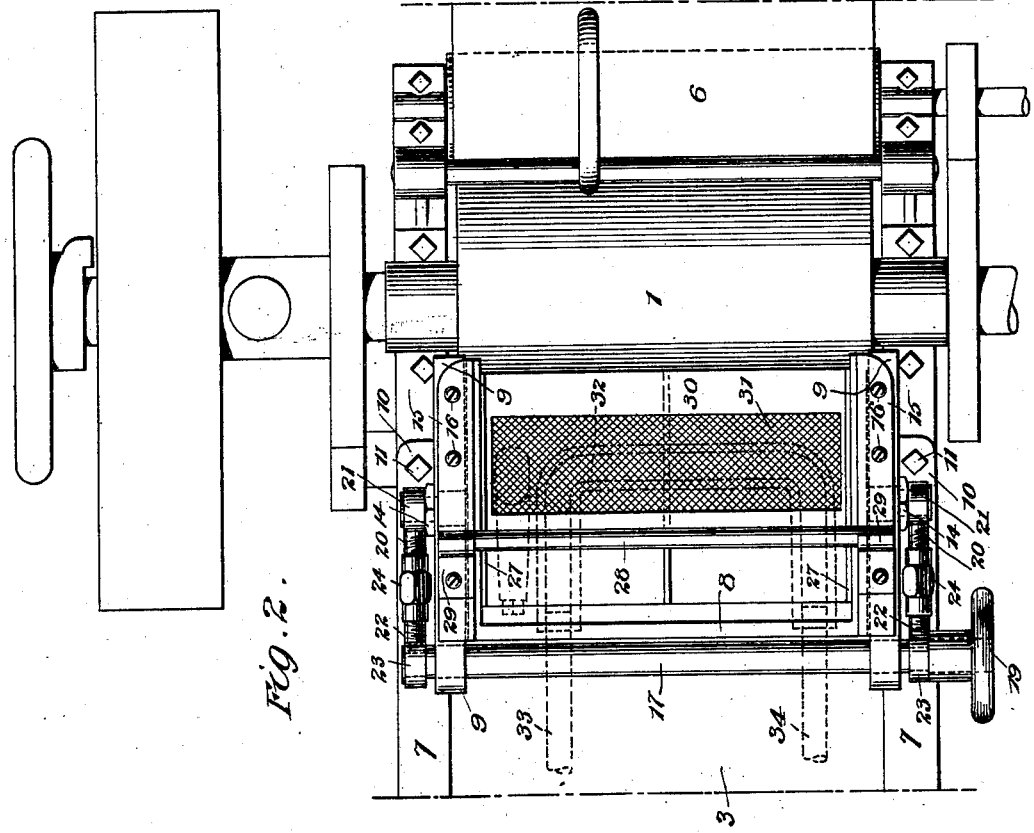
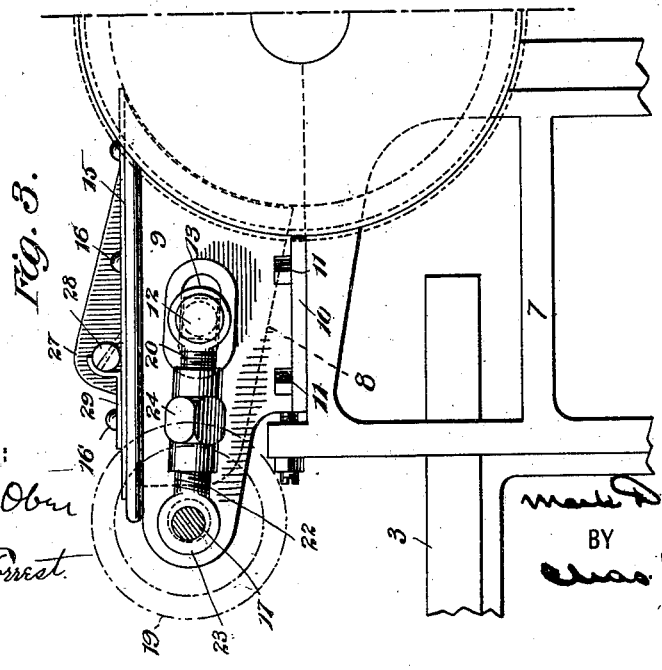
WITNESSES:
Frank S. Ober
M. L. Forrest
INVENTOR
Mark D. Knowlton
BY
Chas. F. Dane
ATTORNEY No. 676,237. Patented June 11, 1901.
M. D. KNOWLTON.
GLUE APPLYING MACHINE.
(Application filed Oct. 13, 1899.)
(No Model.) 3 Sheets—Sheet 3.
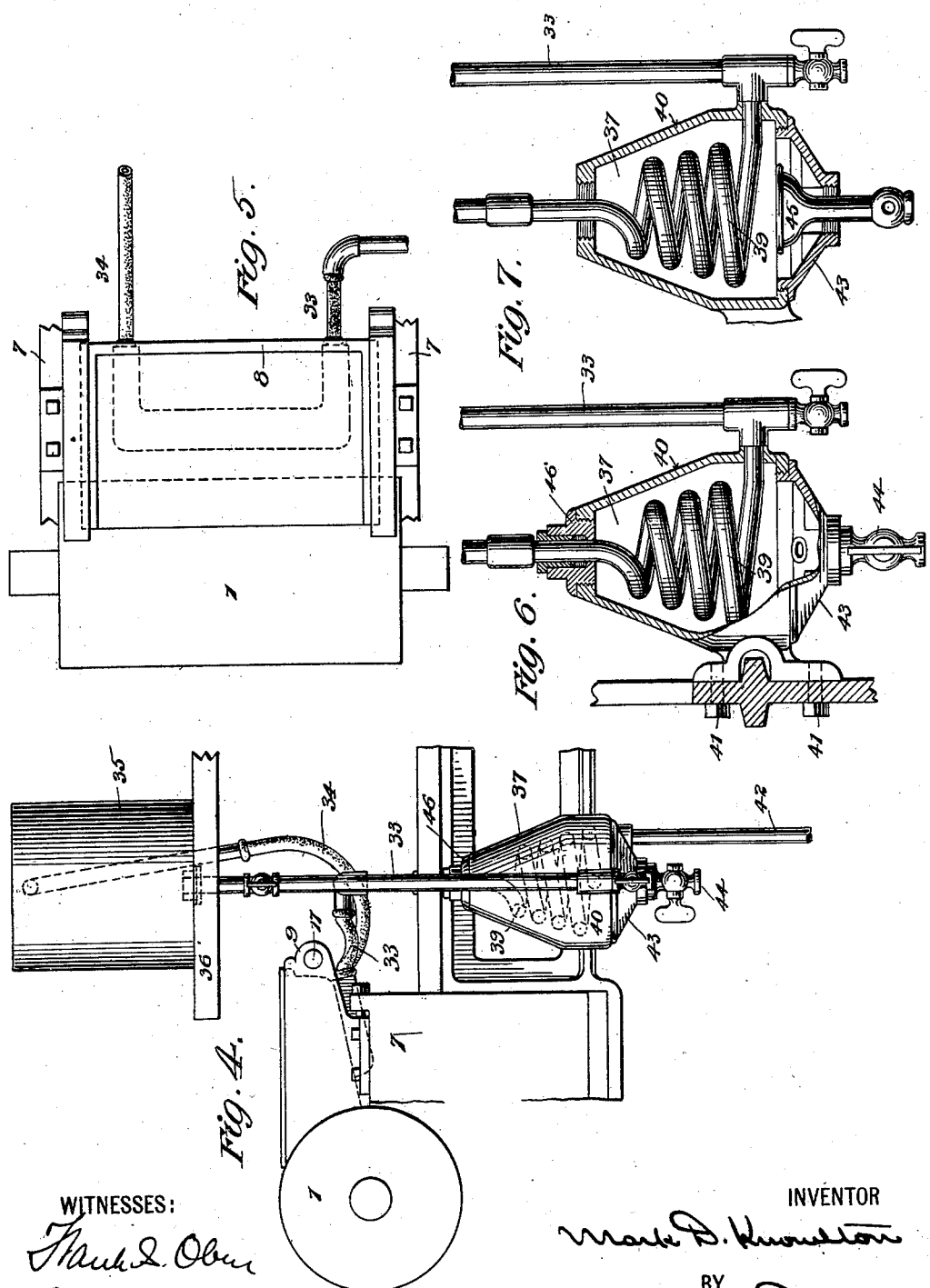
WITNESSES: INVENTOR
BY
ATTORNEY

UNITED STATES PATENT OFFICE.

MARK D. KNOWLTON, OF ROCHESTER, NEW YORK.

GLUE-APPLYING MACHINE.

SPECIFICATION forming part of Letters Patent No. 676,237, dated June 11, 1901.

Application filed October 13, 1899. Serial No. 733,470. (No model.)

*To all whom it may concern:*

Be it known that I, MARK D. KNOWLTON, a citizen of the United States, and a resident of Rochester, Monroe county, State of New York, have invented certain new and useful Improvements in Glue-Applying Machines, of which the following is a specification, reference being had to the accompanying drawings, forming part thereof.

This invention relates to that class of machines adapted for applying an adhesive substance, such as paste or glue, to sheets of paper or other material; and it consists of additional improvements upon the machine disclosed in Letters Patent No. 447,012, issued jointly to another and myself February 24, 1891. In this class of machines, in which the tank or receptacle for containing the glue or other adhesive substance discharges its contents by gravity directly upon the surface of a revolving pasting or gluing roller, the action of the roller causes a revolving motion of the glue at the point of its discharge from the tank, which motion of the glue produces a foaming of the same at such point, which prevents even and uniform coating of the roller by the same. Furthermore, the movement or agitation of the glue being confined to one point permits the formation of a coating or skin on the top of the glue, pieces of which, if not carefully removed from time to time, get lodged between the roller and the adjacent edge of the tank-bottom or so-called "scraper" and clog the flow of the glue at such points, thus causing the roller to become coated in streaks. To avoid such objectionable features and in accordance with my present invention, I have supported a wall or partition within the tank adjacent to its point of discharge, which partition serves to direct the flow of the glue under the action of the roller, causing the same to flow backward under said partition toward the rear of the tank and then return over the top of the partition to the roll. A perfect circulation of the contents of the tank is thus secured, which tends to prevent foaming, allows any foam-bubbles to burst before returning to the roller that might have formed, and also prevents the formation of any coating or skin on the top of the glue.

The above features and others forming part of my present invention will be hereinafter set forth in detail and pointed out in the claims.

Referring to the drawings, Figure 1 is a longitudinal vertical section through a machine embodying my invention. Fig. 2 is a plan view of the machine with certain of the parts broken away. Fig. 3 is an enlarged side elevation of a portion of the machine. Fig. 4 is a side elevation of a portion of the machine, showing a heating apparatus connecting with the glue-tank for keeping the glue or other adhesive substance in a fluid or semifluid condition. Fig. 5 is a plan view of a portion of the construction shown in Fig. 4, and Figs. 6 and 7 are enlarged detail views of a portion of the heating apparatus to be hereinafter referred to.

To explain in detail, the revolving pasting or gluing roller 1, to the surface of which the glue or other adhesive substance is applied and from which said glue or adhesive substance is transferred to the paper sheets brought into contact with said roller, the opposing feed-rolls 2 2 for carrying the paper or other sheets (indicated at *a* in dotted lines) from the table 3 toward or into contact with the roller 1, the guide 4, located between the feed-rolls 2 2 and the roller 1 for directing the sheets passing from said feed-rolls toward and against the surface of the roller 1 approximately at right angles with said surface at the point of contact, the fingers 5, resting in contact with the roller 1 and acting to deflect or throw outwardly from the surface of the roller the sheets adhering thereto, and the carrier belt or apron 6, arranged in position to receive the paper sheets as the latter are removed from the roller 1 by the action of the fingers 5, all being supported and sustained upon a suitable frame 7, are of substantially the same construction, arrangement, and mode of operation as in the said Patent No. 447,012.

The tank or receptacle 8 for containing the glue or other adhesive substance, as herein shown, is supported between two vertically-arranged plates 9 9, which latter are located at opposite sides of the frame 7 and each provided with a flange 10, which rests upon the supporting-frame and is secured thereon by bolts or screws 11 11. One end of these plates 9 9 is constructed to conform to the surface of the roller 1, and the plates are supported with such end in close contact with said roller, as shown in Fig. 3. The glue-tank 8 is supported between the plates 9 9 by means of pins or studs 12 12 at each end thereof, which project through elongated slots 13 in the opposite plates 9 and are secured at their outer threaded ends by means of nuts 14. The sides of this tank at the rear or open end of the same are also constructed to conform to the surface of the roller 1 and rest against the latter as a partial support to the tank, the latter being held in proper horizontal position against undue tilting on pins 12 12 by means of two plates 15 15, which are secured on the upper edge of the supporting-plates 9 9 by means of screws 16, with one side projecting over the upper edge of the tank, as shown in Fig. 2.

As a means for adjusting the tank so that the edge of its bottom may be a greater or less distance from the pasting-roller 1, as may be necessary for feeding a desired quantity of glue to the said roller, I have supported an eccentric-shaft 17 in suitable bearings in the plates 9 9 at the rear end of the glue-tank, which shaft is operatively connected with the projecting ends of the pins 12 12 on the tank. By turning this shaft 17 in the proper direction by means of a hand-wheel 19 thereon the operator may thereby readily adjust the position of the tank back and forth relative to the roller. The connections between the shaft 17 and the tank, as herein shown, consist of two screws 20 20, each having an end collar 21 fitting over the end of the pins 12 12 on the tank, two screws 22 22, having an end collar 23 embracing the shaft 17, and internally-threaded sleeves 24 24, uniting the opposite screws 20 and 22, which latter are provided with right and left hand screw-threads, respectively. By this construction turning of the sleeves 24 in the proper direction will cause either a forward or backward movement of the tank relative to the pasting-roller and enable the opposite ends of the same to be adjusted to different degrees of nearness to the said roller, whereby the thickness of the coating on the latter may be varied toward its opposite ends for different kinds of work.

The lower or bottom wall 25 of the tank is preferably inclined downwardly toward the roller, as shown, and above such bottom is suitably supported the wall or partition 26 for causing a circulation of the glue or other adhesive substance throughout the tank. This partition 26, as shown, consists of a plate which extends across the tank with a relatively small space between the same and the bottom of the tank and with a space between its rear edge and the adjacent roller and between its opposite or forward edge and the adjacent wall of the tank, thus permitting the passage or flow of the glue entirely around the same. By such arrangement of the partition 26 the glue under the action of the revolving pasting-roller 1 is forced back constantly beneath said partition and caused to flow in the direction indicated by the arrows and return to the roller over the top of the partition. Such circulation of the glue, as before mentioned, prevents the formation of any coating or skin on the top of the same, tends to prevent foaming, and insures the glue becoming thoroughly settled by the time it returns to the pasting-roller 1.

The partition 26 in the present instance shown is supported in a removable position in the tank by means of a suitable frame composed of two plates 27 27, with which the partition is connected at its opposite ends, and a rod 28, extending through said frame-plates 27 27, with its ends projecting beyond the outer sides of the latter. Such frame is removably supported in position within the glue-tank with the ends of the rod 28 resting upon the retainer-plates 15 15 and the forward upper ends of the plates 27 27 resting directly upon the roller 1, as more clearly shown in Fig. 1. The frame is held in its proper position relative to the roller by means of two bracket-fingers 29 29, secured on the plates 15 15, beneath which the ends of the rod 28 are inserted when the frame is placed into the glue-tank.

The means for scraping the surplus glue or other adhesive substance from the roller, together with any particles of paper which may adhere thereto, and subsequently straining the same before the glue is returned to the tank, is similar to that described in the said prior patent, No. 447,012. In this instance I provide a plate 30, which is supported at one side by the cross-rod 28, and at its opposite side is formed with a sharp or thin edge adapted to rest directly against the surface of the roller 1, the plate being inclined downwardly or away from the roller and toward the tank, as clearly shown in Fig. 1. The central portion of this plate 30 is cut away so as to form an opening therein, which opening is covered with wire-cloth or other suitable perforated material 31, which receives the material scraped from the roller and strains the glue before the latter returns to the tank, the passage of the glue over the scraper and through the strainer being indicated by arrows in Fig. 1.

In keeping the glue or other adhesive material in the tank properly heated it has been found that the use of steam of the proper temperature when brought into contact with the glue-tank will cause the latter to unduly expand and so warp the same as to render it useless. For such reason I have found it desirable to use hot water as a means for heating the glue, and the apparatus employed for such purpose according to my invention is as follows: The glue-tank is provided with a chamber 32, extending across its under side and terminating adjacent to the opposite ends of the tank, at the rear side thereof. Pipes or other suitable conduits 33 and 34 connect the opposite ends of said chamber 32 with a water-tank 35, so as to provide a circulation between the same, the said water-tank being supported upon a suitable platform 36, which is carried by the main supporting-frame through the medium of suitable intermediate supports. (Not shown in the drawings.) The pipe 33, through which the water passes from the tank 35 to the chamber 32, extends through a heating-chamber 37, in which the water passing through the pipe is heated to the proper temperature before entering the glue-tank chamber 32, the said pipe 33 being formed with a coil 39 in the heating-chamber 37, so as to provide an increased heating-surface.

The heating-chamber 37 is formed in a frame or casting 40, which, as shown, is located beneath the feeding-table of the machine and secured to the frame 7 by means of bolts or screws 41 41. This heating-chamber 37 is adapted to be heated either by the introduction of steam therein or by gas, as may be desired. When used for steam, the chamber is made air-tight and the steam is introduced therein through a pipe 42, which opens into the chamber through a removable plate 43, having a screw-threaded connection with the lower end of the casing 40, which latter is also provided with a petcock 44, removably connected therewith for the exhaust-steam. To adapt the chamber 37 for gas-heating, the plate 43 is first removed from the casting 40, the petcock 44 then detached from said plate 43 to permit of the insertion of a gas-burner attachment 45 in the opening from which said petcock is removed, the plate 43, with the supported gas-burner attachment, then again screwed into connection with the casting 40, and a removable plate or ring 46 at the top of the chamber then removed to permit of the entry of air therein, as shown in Fig. 7.

Having thus set forth my invention, what I claim, and desire to secure by Letters Patent, is—

1. In a machine of the class described, the combination, with a revolving roller and means for feeding and carrying sheets to be operated upon against the surface of said roller, of a glue tank or receptacle discharging by gravity upon the surface of said roller, and having means located therein adjacent to the point of discharge of the tank for directing the flow of the glue at such point and causing an increased circulation of the same, for the purpose set forth.

2. In a machine of the class described, the combination, with a revolving roller and means for feeding and carrying sheets to be operated upon against the surface of said roller, of a glue tank or receptacle discharging by gravity upon the surface of said roller, and having a stationary device located therein adjacent to the point of discharge of the tank for directing the flow of the glue at such point, for the purpose set forth.

3. In a machine of the class described, the combination, with a revolving roller and means for feeding and carrying sheets to be operated upon against the surface of said roller, of a glue tank or receptacle discharging by gravity directly upon the surface of said roller, and having a wall or partition located therein with a space or passage around the same between the tank and the roller, for the purpose set forth.

4. A glue tank or receptacle having an open side through which it is adapted to discharge by gravity, and a wall or partition located therein adjacent to its point of discharge with a space between the tank and said partition to form a continuous passage around the latter, for the purpose set forth.

5. In a machine of the class described, the combination, of a glue-receptacle having a chamber, a water-tank, inlet and outlet connections between said water-tank and chamber to form a circulation between the same, one of said connections being formed with a coil, and a chamber inclosing said coil having means for the introduction of heat therein, for the purpose set forth.

6. In a machine of the class described, the combination, of a glue-receptacle having a chamber, a water-tank, inlet and outlet connections between said water-tank and chamber to form a circulation between the same, one of said connections being formed with a coil, and a heating-chamber inclosing said coil having a removable plate for the support of a heating or heat-introducing device, and a second removable plate or device for admitting or closing off the air from said chamber, for the purpose set forth.

MARK D. KNOWLTON.

Witnesses:
CHAS. F. DANE,
FRED W. DANE.